(12) United States Patent
Morena et al.

(10) Patent No.: US 11,023,868 B2
(45) Date of Patent: Jun. 1, 2021

(54) VIRTUAL CURRENCY SYSTEM AND METHOD THEREFOR

(71) Applicant: ZAPCOW INC., Montreal (CA)

(72) Inventors: Joseph Morena, Montreal (CA); Cono Fusco, Montreal (CA); Vince Morena, Montreal (CA)

(73) Assignee: ZAPCOW INC., Montreal (CA)

( * ) Notice: Subject to any disclaimer, the term of this patent is extended or adjusted under 35 U.S.C. 154(b) by 17 days.

(21) Appl. No.: 16/617,729

(22) PCT Filed: Jun. 27, 2018

(86) PCT No.: PCT/CA2018/000131
§ 371 (c)(1),
(2) Date: Nov. 27, 2019

(87) PCT Pub. No.: WO2019/000072
PCT Pub. Date: Jan. 3, 2019

(65) Prior Publication Data
US 2020/0111071 A1    Apr. 9, 2020

Related U.S. Application Data
(60) Provisional application No. 62/525,702, filed on Jun. 27, 2017.

(51) Int. Cl.
*G06Q 40/00* (2012.01)
*G06Q 20/10* (2012.01)
(Continued)

(52) U.S. Cl.
CPC .......... *G06Q 20/10* (2013.01); *G06Q 20/065* (2013.01); *G06Q 20/227* (2013.01);
(Continued)

(58) Field of Classification Search
CPC ...... G06Q 20/10; G06Q 40/025; G06Q 40/10; G06Q 30/0283; G06Q 40/12
See application file for complete search history.

(56) References Cited

U.S. PATENT DOCUMENTS

| | | | | |
|---|---|---|---|---|
| 2008/0167965 | A1* | 7/2008 | Von Nothaus | G06Q 20/20 705/17 |
| 2013/0246233 | A1* | 9/2013 | Hakim | G06Q 40/10 705/30 |

(Continued)

OTHER PUBLICATIONS

Peng (Virtual Money Supply Model with Virtual Banks, The Research on Network Virtual Money Supply Model, 2009 International Conference on Future Networks, ISBN (Paper): 978-0-7695-3567-8 (pp. 18-22), 2009) (Year: 2009).*

(Continued)

*Primary Examiner* — Elizabeth H Rosen
*Assistant Examiner* — Mark H Gaw
(74) *Attorney, Agent, or Firm* — Lee & Hayes, P.C.

(57) ABSTRACT

A virtual currency method and a system comprises a virtual currency controller in communication with a real bank account comprising real currency and with one or more merchant controllers under the authority of respective merchants providing products and/or services for sale to users. The virtual currency controller comprises a virtual bank comprising a first amount of virtual currency units and virtual user bank accounts assigned to users and a second amount of virtual currency units separately allotted into respective ones of user's virtual bank accounts, wherein an exchange rate of the virtual currency units is determined based on the value of real currency in the real bank account, the total of the first amount of virtual currency units and the total of the second amount of virtual currency units. Users (Continued)

are provided to exchange virtual currency units for real currency in the real bank account based on the exchange rate.

20 Claims, 4 Drawing Sheets

(51) Int. Cl.
*G06Q 20/06* (2012.01)
*G06Q 20/22* (2012.01)
*G06Q 20/38* (2012.01)
*G06Q 20/40* (2012.01)
*G06Q 30/02* (2012.01)
*G06Q 40/02* (2012.01)

(52) U.S. Cl.
CPC ........... *G06Q 20/381* (2013.01); *G06Q 20/40* (2013.01); *G06Q 30/02* (2013.01); *G06Q 40/02* (2013.01)

(56) References Cited

U.S. PATENT DOCUMENTS

| | | | | |
|---|---|---|---|---|
| 2015/0127495 | A1* | 5/2015 | Houri | G06Q 20/06 705/26.81 |
| 2015/0269541 | A1* | 9/2015 | MacGregor | G06Q 20/10 705/39 |
| 2017/0091721 | A1* | 3/2017 | Ronca | G06Q 20/367 |
| 2017/0364999 | A1* | 12/2017 | Herriger | G06Q 20/381 |
| 2018/0225757 | A1* | 8/2018 | Chen | G06Q 40/04 |
| 2020/0005280 | A1* | 1/2020 | Ronca | G06Q 20/367 |

OTHER PUBLICATIONS

Publication: "Exploration on Operation of Online Virtual Currency" (Peng et al.)—IEEE-2009 International Conference on E-business and Information System Security—Wuhan, May 23-24, 2009—pp. 1 to 4 (see Abstract).

* cited by examiner

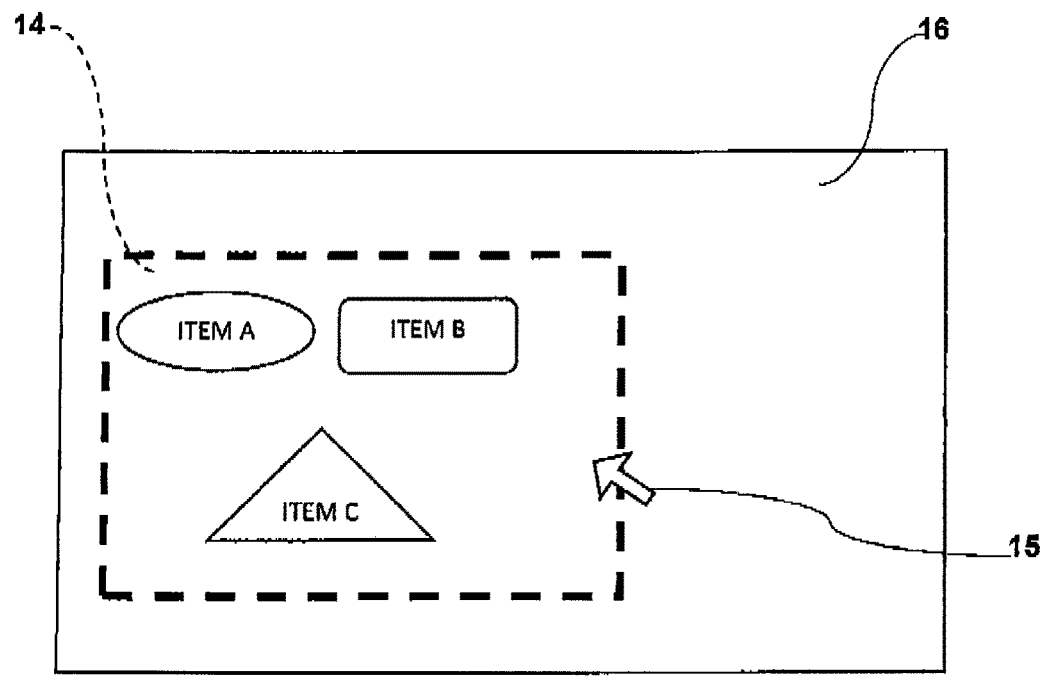
FIG. 2
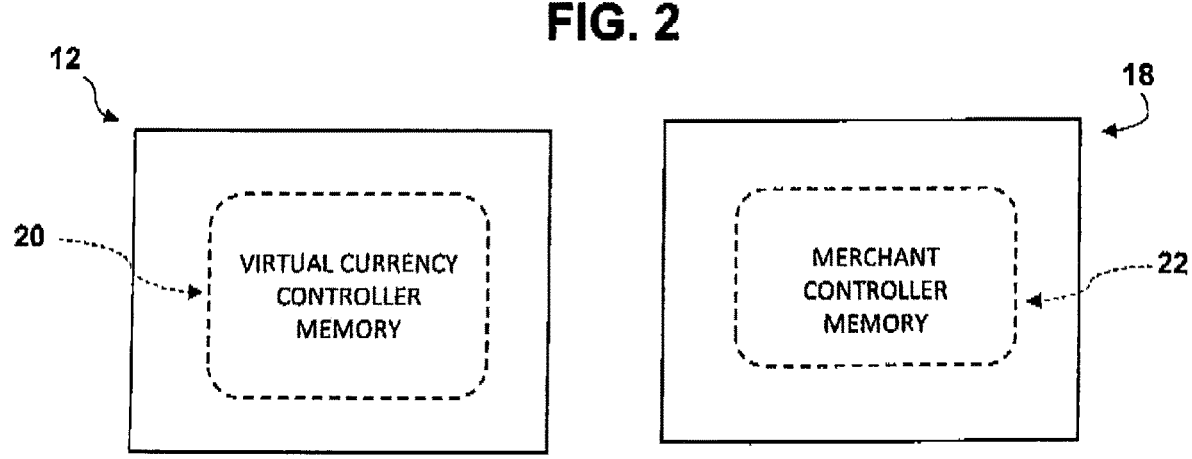
FIG. 3  FIG. 4

VIRTUAL CURRENCY SYSTEM AND METHOD THEREFOR

CROSS-REFERENCE TO RELATED APPLICATIONS

The present application claims priority on U.S. Provisional Patent Application No. 62/525,702 filed on Jun. 27, 2017 and incorporated by reference herein in its entirety.

TECHNICAL FIELD

The present disclosure relates to a virtual currency. More specifically, but not exclusively, the present disclosure relates to a virtual currency system and method therefor.

BACKGROUND

Digital currency exchanges (DCEs) otherwise known as cryptocurrencies such as Bitcoin, Ethereum, Litecoin and the like are known in the art. The validity of each cryptocurrency's coins is provided by a blockchain. A blockchain is a ledger of a continuously growing list of records, called blocks, which are linked and secured using cryptography. Other cryptocurrencies such as IOTA do not use a blockchain but instead use a technology called tangle, which is based off a mathematical concept known as directed acyclic graphs (DAG). These exchanges allow customers to trade digital currencies for other assets, such as conventional fiat money, or other different digital currencies. These types of businesses can exchange traditional payment methods and digital currencies, or strictly online businesses, exchanging electronically transferred money and digital currencies.

Virtual Money is also known in the art and consists of the digital representation of value that is issued and controlled by its developers and used and accepted among the members of a specific (virtual) community.

Unlike regular money, virtual money relies on a system of trust and not issued by a central bank or other banking authority.

OBJECTS

An object of the present disclosure is to provide a virtual currency system.

An object of the present disclosure is to provide a method of providing and managing a virtual currency.

SUMMARY

In accordance with an aspect of the present disclosure, there is provided a virtual currency system comprising: a virtual currency controller in communication with a real bank account comprising real currency and with one or more merchant controllers under the authority of respective merchants providing products and/or services for sale to users, the virtual currency controller comprising: a virtual bank comprising a first amount of virtual currency units and virtual user bank accounts assigned to users and comprising a second amount of virtual currency units separately allotted into respective ones of the virtual user bank accounts, wherein the virtual currency units in a given bank account assigned to a given user being at the sole disposal of that given user; a user interface in communication with the virtual currency controller for being accessed by a user, the user interface providing the user access to a respective one of the virtual user bank accounts and to the products and/or services provided by the merchant controllers; a memory of computer implementable steps comprising the steps of: (a) determining an exchange rate of the virtual currency units based on the value of real currency in the real bank account, the total of the first amount of virtual currency units and the total of the second amount of virtual currency units; (b) providing users to exchange virtual currency units for real currency in the real bank account based on the exchange rate; (c) selectively allotting a given amount of virtual currency units to the user based on a purchase of a product and/or service by the user via the user interface; and (d) providing for users to purchase products and/or services with total or partial payment by virtual currency units for their respective user bank accounts.

In an embodiment, the virtual currency system further comprises a database of virtual currency points allotted to users based on predetermined requirements in the memory and being exchangeable for virtual currency units, wherein step (b) further comprises selectively allotting a given amount of virtual currency points representing a given amount of virtual currency units in lieu of direct virtual currency units.

In an embodiment of the virtual currency system, payment with virtual currency units in step (d) is redeposited in the virtual bank as a part of the first amount or exchanged for real currency based on the exchange rate and deposited in the real bank account.

In an embodiment of the virtual currency system, merchants are provided with depositing real currency into the real bank account.

In an embodiment of the virtual currency system, the memory of computer implementable steps comprises a formula selected from the group consisting of: (I)(a); (I)(b); (I)(c); (I)(d); (I)(e); (II)(a); (II)(b); (II)(c); (II)(d); (III)(a); (III)(b); (III)(c); (IV)(a); (IV)(b); (V)(a); (V)(b); (V)(c); (V)(d); (V)(e); (VI)(a); (VI)(b); (VII) and any combination thereof.

In accordance with an aspect of the present disclosure, there is provided a method of providing and managing a virtual currency comprising: providing a real bank account comprising real currency; providing users access to products and/or services offered by merchants for sale; providing a virtual bank comprising a first amount of virtual currency units; providing virtual user bank accounts within the virtual bank assigned to users and comprising a second amount of virtual currency units separately allotted into respective ones of the virtual user bank accounts, wherein the virtual currency units in a given bank account assigned to a given user being at the sole disposal and accessibility of that given user; determining an exchange rate of the virtual currency units based on the value of real currency in the real bank account, the total of the first amount of virtual currency units and the total of the second amount of virtual currency units; providing users to exchange virtual currency units for real currency in the real bank account based on the exchange rate; selectively allotting a given amount of virtual currency units to the user based on a purchase of a product and/or service by the user; and providing for users to purchase products and/or services with total or partial payment by virtual currency units from their respective user bank accounts.

In an embodiment, the method further comprises providing database of virtual currency points allotted to users based on predetermined requirements in the memory and being exchangeable for virtual currency units, wherein step, wherein selectively allotting a given amount of virtual currency units comprises selectively allotting a given amount of virtual currency points representing a given amount of virtual currency units in lieu of direct virtual currency units.

In an embodiment of the method, payment with virtual currency units in step is redeposited in the virtual bank as a part of the first amount or exchanged for real currency based on the exchange rate and deposited in the real bank account.

In an embodiment of the method, merchants are provided with depositing real currency into the real bank account.

In an embodiment, the method further comprises effectuating real time calculation based on a formula selected from the group consisting of: (I)(a); (I)(b); (I)(c); (I)(d); (I)(e); (II)(a); (II)(b); (II)(c); (II)(d); (III)(a); (III)(b); (III)(c); (IV)(a); (IV)(b); (V)(a); (V)(b); (V)(c); (V)(d); (V)(e); (VI)(a); (VI)(b); (VII) and any combination thereof.

In an embodiment, the memory of computer implementable steps comprises determining the exchange rate of the virtual currency based on the steps represented by formula (I)(a):

$$YV = \frac{BSV}{(Q+M)}$$

wherein YV represents the exchange rate of the virtual currency unit, wherein BSV represents the amount of real currency held in the real bank, wherein Q represents the total amount of virtual currency units held in the virtual bank and not owned by users, and wherein M represents the total amount of virtual currency units held in the virtual bank accounts of users.

In an embodiment, the memory of computer implementable steps comprises determining a modified exchange rate of the virtual currency based on the steps represented by formula (I)(e):

$$\text{modified } YV = \frac{BSV - (D)YV}{(Q+D)+(M-D)}$$

wherein modified YV represents the modified exchange rate of the virtual currency unit, wherein D represents a discount offered by a merchant to users on an item in the form of a given quantity of virtual currency units in lieu or in addition to a given amount of real currency for the purchase of the item.

In an embodiment, the memory of computer implementable steps comprises determining the BSV based on the steps represented by the formula (III)(a):

$$BSV=(Q)YV+(M)YV.$$

In an embodiment, the memory of computer implementable steps comprises determining a new exchange rate based on the steps represented by formula (I)(b) or by formula (I)(c) or by formula (I)(d), wherein formula (I)(b) comprises:

$$newYV = \frac{newBSV}{(newQ+M)},$$

wherein formula (I)(c) comprises:

$$newYV = \frac{\text{new } BSV}{(newQ + newM)},$$

wherein formula (I)(d) comprises:

$$newYV = \frac{\text{new } BSV}{(Q + newM)},$$

wherein newYV represents a new exchange rate in light of a previous exchange rate YV, wherein newBSV represents a new amount of real currency held in the real bank in light of a previous amount of real currency held in the real bank, wherein newBVS is determined by the computer implementable steps represented by formula (III)(b) or by formula (III)(c), wherein formula (III)(b) comprises: newBSV=BSV+(X−newSA), wherein X represents the new real currency added to the BSV, wherein newSA is determined by the computer implementable steps represented by formula (IV)(b): newSA=SA+(SAR)X, wherein SA represents a portion of the total currency value of the BSV that is set aside for absorbing fluctuations of the YV due to overvaluation or undervaluation thereof, wherein SAR is the percentage of the total currency value of the BSV that is set aside for absorbing fluctuations of the YV due to overvaluation or undervaluation thereof, wherein formula (III)(c) comprises: newBSV=BSV−VS, wherein the VS represents the value stream and is determined by the computer implementable steps represented by the formula (IV): VS=BSV−(D)YV, wherein D represents a discount offered by a merchant to users on an item in the form of a given quantity of virtual currency units in lieu or in addition to a given amount of real currency for the purchase of the item, wherein newQ represents a new total amount of virtual currency units held in the virtual bank and not owned by users in light of a previous amount of virtual currency units held in the virtual bank and not owned by users, wherein newQ is determined by the computer implementable steps represented by formula (V)(a) or by formula (V)(b) or by formula (V)(c) or by formula (V)(d) or by formula (V)(e), wherein formula (V)(a) comprises:

$$newQ = Q + \frac{x}{c},$$

wherein formula (V)(b) comprises: newQ=Q−P, wherein formula (V)(c) comprises: newQ=Q+Z, wherein formula (V)(d) comprises: newQ=Q+D, wherein formula (V)(e) comprises: newQ=Q−D, wherein C represents the Golden Ratio φ, wherein P represents the amount of virtual currency units exchanged for a given amount of virtual currency points, wherein Z represents the quantity of virtual currency units that a user converts into real currency, wherein newM represents a new total amount of virtual currency units held in the virtual bank accounts of users s in light of a previous amount of virtual currency units held in the virtual bank accounts of users, wherein newM is determined by the computer implementable steps represented by formula (VI)(a) or by formula (VI)(b), wherein formula (VI)(a) comprises: newM=M−Z, wherein formula (VI)(b) comprises: newM=M−D.

In an embodiment, the memory of computer implementable steps comprises determining the total currency value held in the real bank based on the steps represented by formula (II)(a): TDV=BSV+SA, wherein TDV represents the total currency value in the real bank, wherein BSV represents the total amount of real currency in the real bank, wherein SA represents a portion of the total currency value of the BSV that is set aside for absorbing fluctuations of the YV due to overvaluation or undervaluation thereof.

In an embodiment, the memory of computer implementable steps comprises determining a new total currency value held in the real bank in light of a previous total currency value held in the real bank based on the steps represented by formula (II)(b) or by formula (II)(c) or by formula (II)(d), wherein formula (II)(b) comprises: newTDV=TDV+X, wherein formula (II)(c) comprises: newTDV=newBSV+newSA, wherein formula (II)(d) comprises: newTDV=(Z)YV, wherein newTDV represents the new total currency value held in the real bank, wherein newBSV represents a new amount of real currency held in the real bank in light of a previous amount of real currency held in the real bank, wherein newBVS is determined by the computer implementable steps represented by formula (III)(b) or by formula (III)(c), wherein formula (III)(b) comprises: newBSV=BSV+(X−newSA), wherein formula (III)(c) comprises: newBSV=BSV−VS, wherein X represents the new real currency added to the BSV, wherein newSA is determined by the computer implementable steps represented by formula (IV)(b): newSA=SA+(SAR)X, wherein SA represents a portion of the total currency value of the BSV that is set aside for absorbing fluctuations of the YV due to overvaluation or undervaluation thereof, wherein SAR is the percentage of the total currency value of the BSV that is set aside for absorbing fluctuations of the YV due to overvaluation or undervaluation thereof, wherein the VS represents the value stream and is determined by the computer implementable steps represented by the formula (IV): VS=BSV−(D)YV, wherein D represents a discount offered by a merchant to users on an item in the form of a given quantity of virtual currency units in lieu or in addition to a given amount of real currency for the purchase of the item, wherein Z represents the quantity of virtual currency units that a user converts into real currency.

In an embodiment, the memory of computer implementable steps comprises determining the SA based on the steps represented by formula (IV)(a): SA=(SAR)TDV, wherein TDV represents the total currency value in the real bank, wherein SA represents a portion of the total currency value of the BSV that is set aside for absorbing fluctuations of the YV due to overvaluation or undervaluation thereof.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 2 is a schematic representation of a user interface provided by the virtual currency controller of the virtual currency system navigating a customer interface provided by a merchant controller in accordance with a non-limiting illustrative embodiment of the present disclosure;

FIG. 3 is a schematic representation of the virtual currency controller of the virtual currency system in accordance with a non-limiting illustrative embodiment of the present disclosure;

FIG. 4 is a schematic representation of the merchant controller in communication with the virtual currency system in accordance with a non-limiting illustrative embodiment of the present disclosure;

DETAILED DESCRIPTION OF ILLUSTRATIVE EMBODIMENTS

Figure 1:
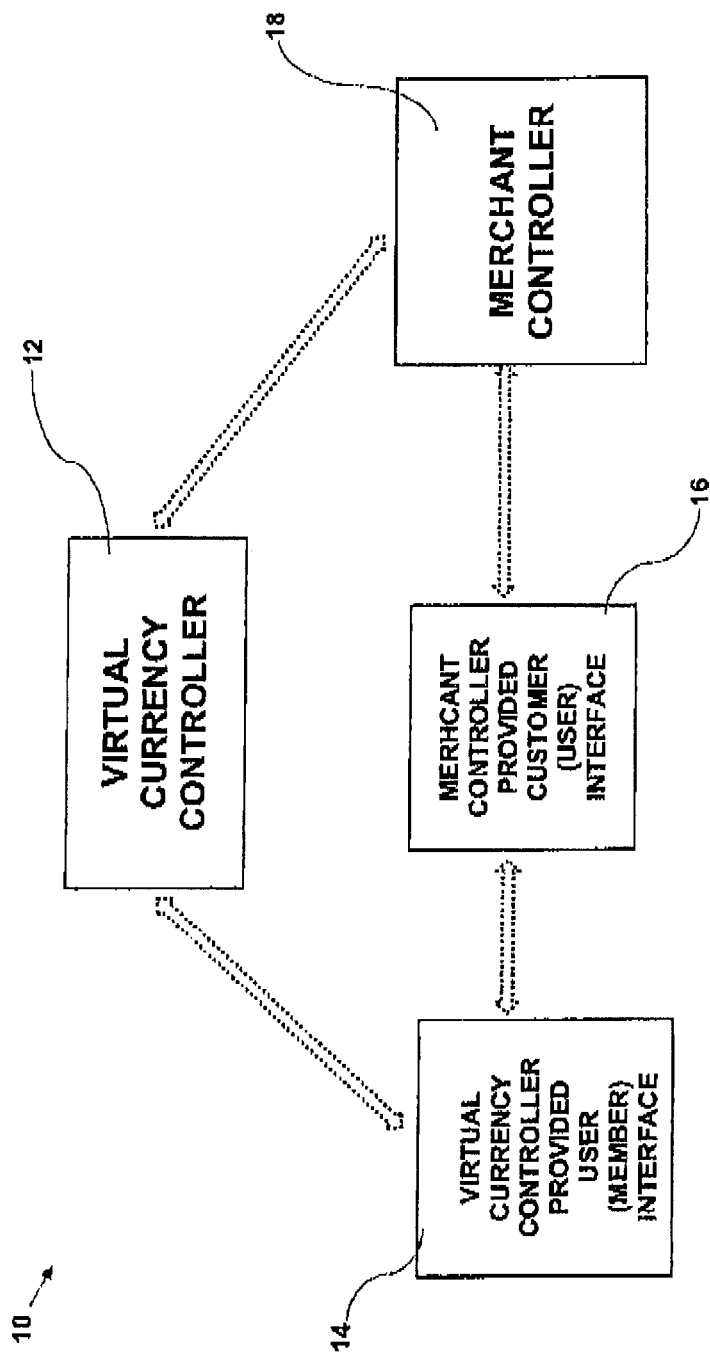
FIG. 1 is schematic representation of the virtual currency system in accordance with a non-limiting illustrative embodiment of the present disclosure.

Generally stated and in accordance with an aspect of the present disclosure, there is provided a virtual currency system comprising a virtual currency controller in communication with a real bank account comprising real currency and with one or more merchant controllers under the authority of respective merchants providing products and/or services for sale to users. The virtual currency controller comprises a virtual bank comprising a first amount of virtual currency units and virtual user bank accounts assigned to users and comprising a second amount of virtual currency units separately allotted into respective ones of the virtual user bank accounts. The virtual currency units in a given bank account assigned to a given user is at the sole disposal of that given user. A user interface is in communication with the virtual currency controller for being accessed by a user. The user interface provides the user access to a respective one of the virtual user bank accounts and to the products and/or services provided by the merchant controllers. The controller comprises a memory of computer implementable steps. An exchange rate of the virtual currency units is determined based on the value of real currency in the real bank account, the total of the first amount of virtual currency units and the total of the second amount of virtual currency units. Users are provided to exchange virtual currency units for real currency in the real bank account based on the exchange rate. A given amount of virtual currency units is selectively allotted to the user based on a purchase of a product and/or service by the user via the user interface. Users are provided to purchase products and/or services with total or partial payment by virtual currency units for their respective user bank accounts.

Generally stated and in accordance with an aspect of the present disclosure, there is provided a method of providing and managing a virtual currency. A real bank account comprising real currency is provided. Users are provided access to products and/or services offered by merchants for sale. A virtual bank is provided comprising a first amount of virtual currency units. Virtual user bank accounts are provided within the virtual bank and assigned to users. The virtual bank accounts comprise a second amount of virtual currency units separately allotted into respective ones of the virtual user bank accounts. The virtual currency units in a given bank account assigned to a given user are at the sole disposal and accessibility of that given user. An exchange rate of the virtual currency units is determined based on the value of real currency in the real bank account, the total of the first amount of virtual currency units and the total of the second amount of virtual currency units. Users are provided to exchange virtual currency units for real currency in the real bank account based on the exchange rate. A given amount of virtual currency units is selectively allotted to the user based on a purchase of a product and/or service by the user. Users are provided to purchase products and/or services with total or partial payment by virtual currency units from their respective user bank accounts.

FIG. 1 shows the virtual currency system 10 comprising a virtual currency controller 12 and a user interface 14 that is in communication with the virtual currency controller 12 and being provided thereby. The user interface 14 is also in communication with a merchant provided customer interface 16 that is provided by a merchant controller 18 that communicates with the virtual currency controller 12.

As shown in FIG. 2, the user can navigate other web-based platform interfaces 16 via the user interface 14. For example, the user may visualize or otherwise access platforms such as Facebook™, Amazon™, LinkedIn™, eBay™, YouTube™, Google™, etc. via user interface 14. In another embodiment, the user interface 14 may be used to visualize a variety of merchant websites. Thus, the user may access merchant controller information for the purposes of effectuating a transaction via the interface 14 which communicates with any variation of the merchant provided interface 18 for such ends. The interface 18 can be a platform or an icon, portion, section and the like on another website or platform for example. In one non-limiting example, the user interface 14 in FIG. 2 is shown to be superimposed directly on interface 16. As such, a user of the system 10 can access a merchant-provided customer interface 16 via the virtual currency controller provided user interface 14. In the present non-limiting example, interface 14 is a window superimposed on the interface 16, a user can select to purchase a variety of items (A, B, C) displayed on interface 16 via interface 14 by clicking on an icon (A, B, C) via cursor 15 for example. The foregoing purchase is communicated to both controllers 12 and 18.

Turning to FIGS. 3 and 4, both the virtually currency controller 12 and the merchant controller 18 include a respective memory 20 and 22 comprising computer implementable steps as will be discussed herein.

Figure 5:
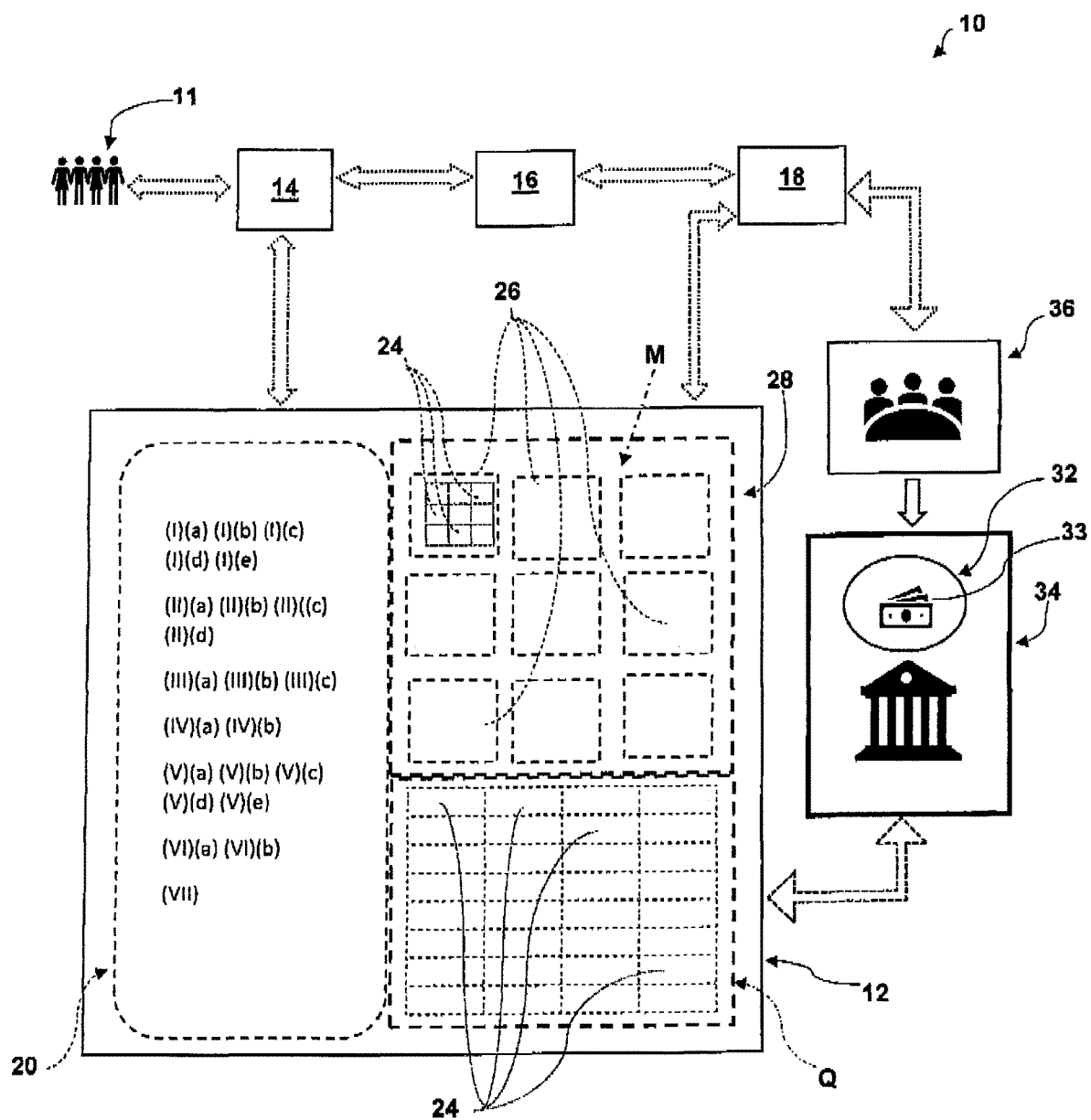
FIG. 5 is a schematic representation of the virtual currency system in accordance with a non-limiting illustrative embodiment of the present disclosure.

FIG. 5 shows the system 10 comprising the controller 12 including a memory 20 of the computer implementable steps (including a series of Formulas further described below). The controller 12 provides virtual currency units (VCU) 24. Users 11 have access via the interface 14 to virtual user accounts 26 containing their VCUs 24. Thus, the VCUs 24 are held within a virtual bank 28. More specifically, the virtual bank 28 comprises a total amount (Q) of VCUs 24 not held by users 11. Therefore, there is a total amount (M) of VCUs held by users 11 in their personal virtual accounts 26 within the virtual bank 28.

FIG. 5 also shows that the virtual currency controller 12 is in communication with the merchant controller 18 and that the user interface 14 communicates with user interface 16. The virtual currency controller 12 ultimately provides VCUs 24 to users 11 purchasing products and/or services via the user interfaces 14 and 16 as explained above thus allowing each user to accumulate VCUs 24 into their virtual bank account 26 within the virtual bank 28. A given virtual bank account 26, much like a real bank account, is accessible only to the authorized user via the user interface 14. As shown, the virtual bank 28 thus comprises a plurality of user accounts 26 accessible to authorized users 11 only.

Figure 6:
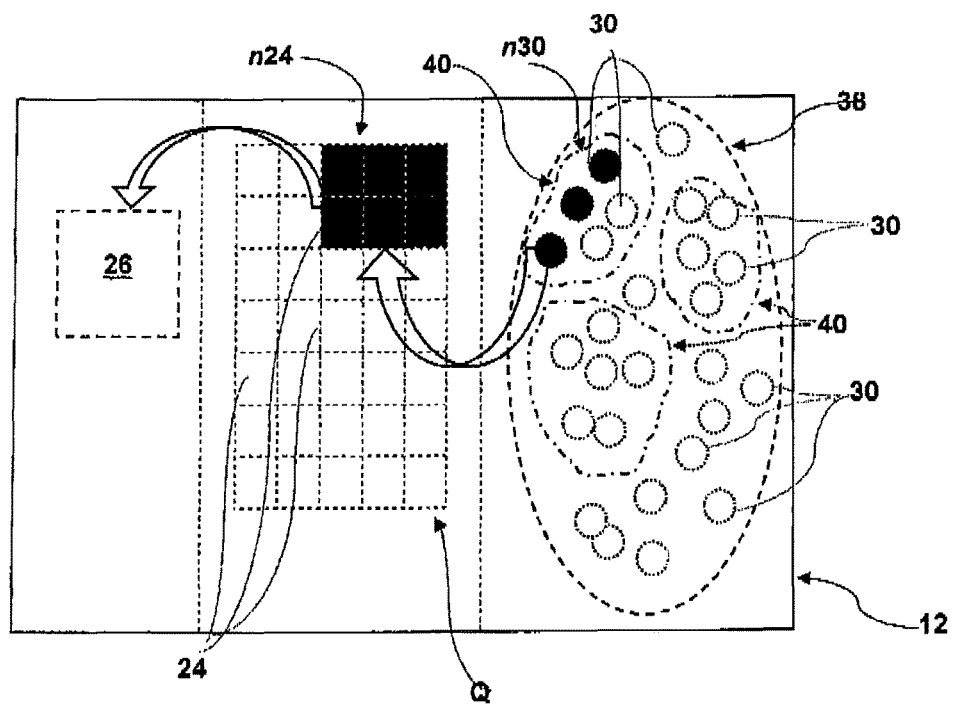
FIG. 6 is a schematic representation of the virtual currency controller of the virtual currency system showing the correlation between virtual currency points and virtual currency units in accordance with a non-limiting illustrative embodiment of the present disclosure.

Turning to FIG. 6, the virtual currency controller 12 also provides virtual currency points (VCP) 30 to the users 11. Thus, the virtual currency controller 12 comprises a database 38 of VCPs 30. As will be further explained below, VCPs 30 are exchangeable for VCUs 24. Hence, in lieu of users 11 obtaining direct VCUs 24 via the purchase of products and/or services mentioned above, users 11 are assigned VCPs 30 which can be exchanged for VCUs 24.

Turning back to FIG. 5, the value of VCUs 24 is dependent on real fiat currency held within a system 10 controlled bank account 32 in a real bank or other financial institution 34. In the example herein, the real fiat currency is USD, denoted with reference numeral 33. Merchants 36 who own or otherwise control the respective controllers 18 invest monies 33 into the bank account 32 as will be explained herein.

As will be explained further below, the VCUs 24 can also be exchanged for real fiat currency 33.

Turning back to FIG. 6 and still referring to FIG. 5, the controller 12 comprises a database 38 of VCPs 30 as previously mentioned. Users 11 are provided VCP accounts 40 of the VCPs 30 that they have accumulated. A given number of VCPs 30 (nVCP) is exchangeable for a given number of VCUs 24 (nVCU).

As will be explained further below, the real market value (exchange rate) of the virtual currency is determined by a series of computer implemented steps held in the memory 20 of the controller 12. Thus, the virtual currency controller 12 provides for modulating the circulation and market value of the VCUs 24 as will be detailed below.

The virtual currency controller 12 provides virtual currency points 30. A predetermined amount of virtual currency points 30 can be exchanged for virtual currency units 24.

In order to facilitate the description, the following acronyms are provided:

VCU: Virtual Currency Unit (24)

VCP: Virtual Currency Points (30)

Figure 7:
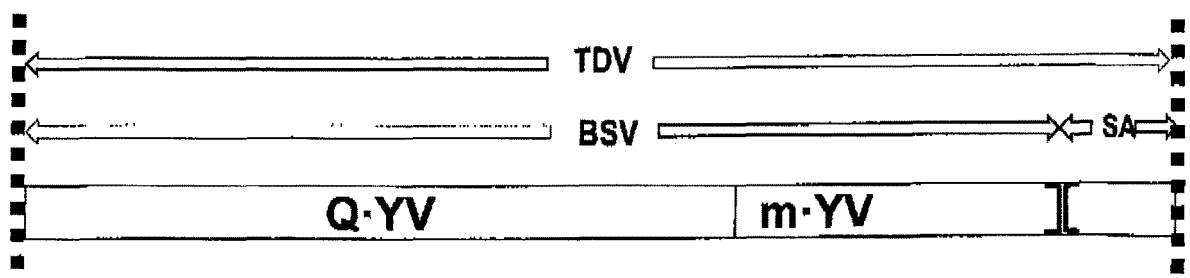
FIG. 7 is a schematic representation of the real fiat currency value held in a real bank account and its correlation to the virtual currency units provided by the virtual currency system in accordance with a non-limiting illustrative embodiment of the present disclosure.

YV: Set value of the virtual currency (see FIG. 7). The YV is the market value (exchange rate) of the VCU 24.

BSV: Bank cash value (see FIG. 7). The BSV is the market value of the actual real currency (e.g. US Dollars) held in the bank account 32. The virtual bank 28 is therefore in communication with the real bank account 32 held in a real bank or financial institution 34, and the moneys 33 within this real bank account 32 guarantee the VCU 24, much like in the gold standard monetary system in which the standard economic unit of account is based on a fixed quantity of gold, the virtual currency is based on the real quantity of the BSV in its real account.

X: New dollars added to the bank. This is the amount of new moneys 33 added to the BSV.

TDV: Total dollar value (see FIG. 7). The TDV is the BSV plus an additional amount of moneys provided as a shock absorber (SA) for absorbing fluctuations of the YV due to overvaluation or undervaluation of the YV. Therefore, TDV=BSV+SA. The present system 10 provides for merchants 36 to deposit moneys 33 into the account 32. These new moneys are represented by X. In essence, the system 10 sells services to the merchants 36 such as advertising and the like. A portion (e.g. 10-30%) of the moneys from this sale is deposited into the account 32. A predetermined percentage, (e.g. 0%-15%-30% etc.) of these deposits comprises the SA and the remainder (e.g. 100%-85%-70% etc.) comprises the BSV.

SA: Shock absorber (see FIG. 7). Is a money value portion of the TDV that is set aside for absorbing fluctuations of the YV due to overvaluation or undervaluation of the YV. SA is a variable that is subject to change.

SAR: Shock absorber ratio. This is the percentage of the TDV that is set aside as a SA.

Q: Virtual currency bank quantity (see FIG. 7). Q is the total amount of VCU 24 held by the Virtual Bank 28 and not owned by users 11.

M: Virtual currency owned by users 11 (see FIG. 7). M is the total amount of VCU 24 that are owned by members (users) in their private accounts.

C: Constant value of φ, otherwise known as the Golden Ratio which is 1.6180 (1.6180339887498948482 . . . ).

P: Virtual currency points quantity. P is the amount of VCUs 24 exchanged for a given amount of VCPs 30.

Z: Virtual currency dollars quantity. Z is the quantity of VCU 24 that a member wishes to convert/exchange for actual real currency (e.g. USD)

D: Item VCU price (discount)/Virtual Price. D is the quantity of VCU 24 required for a user to purchase an item (product or service) offered by a merchant 36.

VS: Value stream. Merchants 36 may offer items (products or services) to users 11 via the system 10 as explained above. These items are offered at a given D which may be the full acquisition price or a discount on the real currency price. The Items may be offered as a promotional gift to have the users 11 become customers of the merchants (joining a website, purchasing other products etc.). In any event, once the user purchases a given item with VCU 24 based on D, this amount is exchanged for real fiat currency 33 and all or a portion thereof is redeposited into the bank account 32 as X.

When new moneys 33 are deposited (X) into the real bank account 32, this information is communicated to the controller 12 which then processes a series of computer implemented steps stored in its memory 20 including the following Formulas (see FIG. 5):

(I)

$$YV = \frac{BSV}{(Q+M)} \quad (a)$$

$$newYV = \frac{new\ BSV}{(newQ+M)} \quad (b)$$

$$newYV = \frac{new\ BSV}{(newQ+newM)} \quad (c)$$

$$newYV = \frac{new\ BSV}{(Q+newM)} \quad (d)$$

$$modified\ YV = \frac{BSV-(D)YV}{(Q+D)+(M-D)} \quad (e)$$

(II)

$$TDV = BSV + SA \quad (a)$$

$$newTDV = TDV + X \quad (b)$$

$$newTDV = newBSV + newSA \quad (c)$$

$$newTDV = (Z)YV \quad (d)$$

(III)

$$BSV = (Q)YV + (M)YV \quad (a)$$

$$newBSV = BSV + (X - newSA) \quad (b)$$

$$newBSV = BSV - VS \quad (c)$$

(IV)

$$SA = (SAR)TDV \quad (a)$$

$$newSA = SA + (SAR)X \quad (b)$$

(V)

$$newQ = Q + \frac{x}{C} \quad (a)$$

$$newQ = Q - P \quad (b)$$

$$newQ = Q + Z \quad (c)$$

$$newQ = Q + D \quad (d)$$

$$newQ = Q - D \quad (e)$$

(VI)

$$newM = M - Z \quad (a)$$

$$newM = M - D \quad (b)$$

(VII)

$$VS = BSV - (D)YV$$

The following non-limiting examples will be used to further illustrate the above-mentioned computer implemented steps:

Example 1

The current financial status of the system 10 is:
YV=0.5 USD/VCU
BSV=USD 42,693.75 (82.5% of TDV)
SA=USD 9,056.25 (17.5% of TDV)
Q=USD 68,132.50
M=USD 117,255.00
TDV=USD 51,750.00
C=1,618
X=Variable
Z=Variable
P=Variable
SAR=17.5%

The system 10 provider receives an influx of USD 50,000.00 from merchants 36. A portion of this influx is deposited to the account 32 that is in communication with the controller 12. In this example, 13.75% is deposited into account 32, namely USD 6,875.00. As such, X=USD 6,875.00. The new Q is obtained by applying Formula (V)(a) above=USD 72,381.5729. The new TDV is obtained by applying Formula (II)(b) above=USD 58,625.00 and more precisely Formula (II)(c) above=USD 58,624.75

The new BSV is obtained with Formula (III)(b) above=USD 48,365.625 and the new SA with Formula (IV)(b) above=10,259.125. As such, the new YV is based on Formula (I)(b) above=0.5395 (which considers both the new Q and the new BSV).

Therefore, when the above series of calculations are implemented following the influx of USD 50,000.00, the initial given values are modified to provide the following results:
YV=0.5395 USD/VCU
BSV=USD 48 385.625 (82.5% of TDV)
SA=USD 10,259.125 (17.5% of TDV)
Q=USD 72,381.5729
M=USD 17,255.00
TDV=USD 58,624.75

Example 2

When a user 11 exchanges an amount of VCPs 30 (nVCP) for a given number VCUs 24 (nVCU), the Virtual Bank 28 loses that number of VCU (i.e. P). Therefore, the newQ=Q−P. Consequently, the amount of VCUs 24 owned by the users increases by the same amount that the Virtual Bank 28 lost, i.e. P. Therefore, the newM=M+P.

Keeping the above in mind and updating Formula (III)(a), the BSV=(Q−P)(YV+(M+P)(YV), thus providing us with a new BSV. Accordingly, the YV (exchange rate value) of the VCU 24 are updated by applying Formula (I)(c). Since P cancels itself out in Formula (III)(a), the BSV and the YV remain the same. The computer implemented steps in the memory 20 of the controller 12 have recorded the transfer of VCUs 24 from the virtual bank 28 to the users 11 (M in the memory 20 of the controller 12).

Example 3

In this example, the values of YV, BSV, SA, Q, M and TDV are the resulting values at the end of Example 1.

A given user 11 wishes to turn 1150 VCUs held in its Virtual Bank Account 26 into real currency 33 (e.g. USD). Therefore, Z=1150. Using Formula (II)(d) above, newTDV=(Z)YV, the new TDV is obtained=USD 58,000.325. Accordingly, the SA is updated with Formula (IV)(a)=USD 10,150.7568. Having now updated, both the TDV and the SA, the BSV is updated based on Formula (II)(a), where TDV=BSV+SA and as such, where BSV=TD−SA=USD 47,853.5681.

The new Q is obtained by Formula (V)(c) newQ=Q+Z=USD 73,531.5729. The new M is obtained by Formula (VI)(a) newM=M−Z=USD 16,105.00. Hence, the exchange rate or market value of the VCU 24 is updated based on Formula (I)(c)

$$newYV = \frac{\text{new } BSV}{(newQ + newM)} = USD\ 0.5448 : VCU\ 1.0.$$

Therefore, when the above series of calculations are implemented following the transaction of a member redeeming 1150 VCU, the initial values at the end of Example 1 are modified to provide the following results:
YV=0.5338 USD/VCU
BSV=USD 47,853.561 (82.5% of TDV)
SA=USD 10,150.7568 (17.5% of TDV)
Q=USD 73,531.5729
M=USD 16,10500
TDV=USD 58,004.325

Example 4

In the present system 10, merchants 36 offer products and services to users 11 in exchange for VCUs 24. The merchants 36 do not take possession of the VCUs 24 put deposit these VCUs 24 in the Virtual Bank 28 which is controlled by the system 10.

Therefore, the VCUs 24 paid by the users 11 to the merchants 36 are in fact a discount (D) offered by the merchants 36 on a product or a service. The VCUs 24 are merely an incentivizing element to create a link between the users 11 and the merchants 36. The users 11 pay VCUs 24 and the merchants deposit the VCUs 24 into the bank account 28.

Therefore, the YV is therefore obtained with Formula (I)(e):

$$\text{modified } YV = \frac{BSV - (D)YV}{(Q+D) + (M-D)}$$

The newQ is Q+D and the newM is M−D. D represents the amount of VCUs lost from a given one of the virtual user accounts 26 and gained by the virtual bank account 28.

The VS is obtained by Formula (VII):

$$VS = BSV - (D)YV$$

The new BSV is thus updated with Formula (III)(c) and the new YV obtained with Formula (I)(d).

The above examples demonstrated the effects of four different actions of the system as provided by the memory 20 of computer implemented steps regarding basing the VCUs 24 on the real fiat currency 33:

Action 1: A merchant 36 depositing real money 33 into the real bank account 32.

Action 2: A user 11 exchanges VCPs 30 for VCUs 24.

Action 3: A user 11 redeems VCUs 24 for real currency 33.

Action 4: A merchant 36 offers users 11 products and/or services for VCUs 24.

In an embodiment, each VCU 24 has a serial number similar to real currency thereby avoiding counterfeiting. Moreover, the velocity of circulation of the VCUs 24 can be tracked.

In an embodiment, virtual user accounts 28 of VCUs can only be held by individuals (real people) and not by legal entities such as organizations or moral persons such as corporations, associations, partnerships.

In another example, the system 10 can inform the users 11 via interface 14 that the VCUs 24 will be split and a payout of real currency will be made to each user 11 at a given date. The message also requests that each user 11 sign up a new user 11. If a new user 11 does sign up to the system 10, then both the new user 11 and the user 11 that brought them in get bonus VCPs 30 and VCUs 24. In this example, 50% of all VCUs 24 in circulation (i.e. within accounts 26) are paid out in real fiat currency 33. The remaining VCUs 24 are then valued at USD 0.50-USD 0.75. The BSV is reduced by 50% while the Q is increased by 50%. As such, the increased VCUs 24 (i.e. the Q) can be offered as dividends or derivatives. Accordingly, VCUs 24 can be 'rented' out to users 11 who wish to redeem offers (from merchants 36) that require more VCUs 24 than exist in their accounts 26.

In another example, merchants 36 can offer VCU redemptions to users 11 at a higher YV than the real YV determined by the system 10.

The system 10 can offer derivatives by users 11 or institutions (banks etc.) paying a yearly fee to the system 10, to have knowledge regarding the deposits in the system fiat currency account 32. Moreover, the amounts collected in account 32 can be invested in secure investments (e.g. US GICs) with a foreseeable growth rate.

Users 11 can be offered VCPs 30 by merchants 36 via their handheld Interface 14 (smartphone) as a user is near one of the merchants' 36 establishments. For example, a coffee establishment 36 can locate a user 11 near a store and send them a message via the interface 14 that they will receive a given amount of VCPs 30 for purchasing items (e.g. coffee). Alternatively, the merchants 36 can also offer a discount for payment by VCUs 24 as explained above.

Merchants 36 can also purchase a block of VCPs 30 and offer these VCPs 30 to users 11 and new users 11 for purchasing products and services. Certain types of VCPs 30 can be redeemed for VCUs 24 for a user 11 who signs up a new user 11 or get them to purchase a product and/or a service.

VCPs can also be won via lotteries or games offered by merchants 36.

In another embodiment, the VCUs can be hedged as a zero-risk derivative. For example, if the VCU provider enters into a contract with merchant for a given term and a given value, the VCU provider can modulate the deposits of moneys into its bank account. The VCU provider can decide how many Action 1s and of what amount it can make. Therefore, the amount of the real money 33 of the merchant 36 and the time of the deposited into the real bank account 32 can be modulated. Therefore, the value of VCUs 24 based on the real fiat currency 33 (i.e. the exchange rate of the VCUs 24) can be modulated over the term of the contract. The VCU provider can thus due to the contract guarantee that the exchange rate of the VCU will be a given amount at a given time due to the known potential deposits in the provider's possession.

The following will describe an example of what happens to the real currency after it is deposited in the bank but before it is applied to the TDV (total dollar value). When real fiat money is deposited into an account of the VCU provider in the the form of receivables, this money will be divided so that a portion thereof will be for adding value to the VCU. Some of the funds are placed in a holding account avoiding a large cash injection into the TDV as applying all the credit to the VCUs at once will result in sharp value spike, causing instability and potential aggressive speculation. Therefore, the moneys are applied to the TDV in increments in order to ensure the integrity of the VCU. In doing so, the provider holds onto a deposit schedule that will provide for forecasting with greater certainty the future state of the BSV (bank set value) and the TDV. Knowledge of the future state of the BSV provides for a more certain forecasting of the future state, or value, of YV, namely the value of the VCU. This becomes a zero-risk derivative or a negligible risk derivative. Any entity who has access to the deposit schedule can offer to buy an existing VCU and offer a higher value for it based on this ability to forecast its future value.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A computer-implemented virtual currency system for issuing and managing electronic virtual currency units substantiated by real fiat currency value thereby providing system participating users to purchase products and/or services from system participating merchants with total or partial payment by virtual currency units and for the users to exchange virtual currency units for real currency, and for determining an exchange rate value of the virtual currency units based on a value of real currency in a real bank account of a user thereby providing system participants with a common automatic and real-time fiat money based exchange rate system for the virtual currency units, the virtual currency system comprising:

a virtual currency controller in a network communication with a real bank account that is accessible online comprising real currency and with one or more merchant controllers configured for such communication and accessible to the merchants via merchant interfaces for providing products and/or services for sale to the users, each of the merchant controllers comprising a respective associated memory having controller executable code stored thereon, the virtual currency controller comprising an associated memory having controller executable code stored thereon, wherein execution of the virtual currency controller executable code causes the virtual currency controller to perform steps comprising:

issuing virtual currency units; and providing a virtual bank comprising a first amount of virtual currency units and virtual user bank accounts assigned to the users and comprising a second amount of virtual currency units separately allotted into respective ones of the virtual user bank accounts;

at least one graphical user interface configured for being in a network communication with the virtual currency controller for providing access to the virtual currency controller by the user, the at least one graphical user interface providing the user access to a respective one of the virtual user bank accounts for using virtual currency units by way of commands via the at least one graphical user interface and access to the products and/or services provided by the merchant controllers;

wherein execution of the virtual currency controller executable code causes the virtual currency controller to provide a given user exclusive disposal of the virtual currency units in a given virtual bank account assigned to that given user by way of user disposal commands via the at least one graphical user interface, wherein the virtual currency controller receives the user disposal commands via the at least one graphical user interface and executes the disposal commands, wherein disposal of currency units comprises using currency units for exchange for real currency and/or for purchase of products and or services;

wherein execution of the virtual currency controller executable code causes the virtual currency controller to further perform steps comprising:

a) automatically determining in real-time an exchange rate of the virtual currency units based on a real-time monetary value of real currency in the real bank account, the total of the first amount of virtual currency units and the total of the second amount of virtual currency units;

b) automatically providing users in real-time to exchange virtual currency units for real currency in the real bank account based on the exchange rate by way of user exchange commands via the at least one graphical user interface, wherein the virtual currency controller receives the user exchange commands via the at least one graphical user interface and executes the exchange commands;

c) automatically selectively allotting in real-time a given amount of virtual currency units to the user based on a purchase of a product and/or service by the user via the at least one graphical user interface; and d) providing for users to purchase via purchase commands through the at least one graphical user interface products and/or services with user purchase commands through the at least one graphical user interface for total or partial payment by virtual currency units from their respective virtual user bank accounts, wherein execution of the merchant controller executable code causes the merchant controller to perform steps comprising:

i. offering products and/or services for purchase to users via the at least one graphical user interface by way of the virtual currency controller; and ii. receiving total or partial payment by virtual currency units from the virtual user bank accounts by way of the virtual currency controller, wherein execution of the virtual currency controller executable code causes the virtual currency controller to manage the virtual currency via computational steps comprising:

determining the exchange rate of the virtual currency based on the steps represented by formula (I)(a):

$$YV = \frac{BSV}{(Q+M)}$$

wherein YV represents the exchange rate of the virtual currency unit, wherein BSV represents the amount of real currency held in the real bank, wherein Q represents the total amount of virtual currency units held in the virtual bank and not owned by users, and wherein M represents the total amount of virtual currency units held in the virtual bank accounts of users, wherein the at least one graphical user interface is superimposed and embedded directly on one of the merchant interfaces allowing the user to access the one of the merchant interfaces via the at least one graphical user interface and displays the products and/or services for being selectively purchased by way of purchase commands via the at least one graphical user interface.

2. A virtual currency system according to claim 1, wherein execution of the virtual currency controller executable code further provides a database of virtual currency points allotted to users based on predetermined requirements stored in the memory and being exchangeable for virtual currency units with exchange commands via the at least one graphical user interface, wherein step (b) further comprises selectively allotting a given amount of virtual currency points representing a given amount of virtual currency units in lieu of direct virtual currency units.

3. A virtual currency system according to claim 1, wherein payment with virtual currency units in step (d) is deposited in the virtual bank as a part of the first amount or exchanged for real currency based on the exchange rate and deposited in the real bank account.

4. A virtual currency system according to claim 1, wherein merchants are provided with depositing real currency into the real bank account.

5. A virtual currency system according to claim 1, wherein execution of the virtual currency controller executable code causes the virtual currency controller to further perform steps comprising:

determining a modified exchange rate of the virtual currency based on the steps represented by formula (I)(e):

$$\text{modified } YV = \frac{BSV - (D)YV}{(Q+D) + (M-D)}$$

wherein modifiedYV represents the modified exchange rate of the virtual currency unit, wherein D represents a discount offered by a merchant to users on an item in a form of a given quantity of virtual currency units in lieu or in addition to a given amount of real currency for the purchase of the item.

6. A virtual currency system according to claim 1, wherein execution of the virtual currency controller executable code causes the virtual currency controller to further perform steps comprising:

determining the BSV based on the steps represented by the formula (III)(a):

$$BSV = (Q)YV + (M)YV.$$

7. A virtual currency system according to claim 1, wherein execution of the virtual currency controller executable code causes the virtual currency controller to further perform steps comprising:

determining a new exchange rate based on the steps represented by formula (I)(b) or by formula (I)(c) or by formula (I)(d), wherein formula (I)(b) comprises:

$$newYV = \frac{newBSV}{(newQ + M)}$$

wherein formula (I)(c) comprises:

$$newYV = \frac{newBSV}{(newQ + newM)}$$

wherein formula (I)(d) comprises:

$$newYV = \frac{newBSV}{(Q + newM)}$$

wherein newYV represents a new exchange rate in light of a previous exchange rate YV, wherein newBSV represents a new amount of real currency held in the real bank in light of a previous amount of real currency held in the real bank, wherein newBSV is determined by computer implementable steps represented by formula (III)(b) or by formula (III)(c), wherein formula (III)(b) comprises:

$$newBSV = BSV + (X \text{ new}SA)$$

wherein X represents the new real currency added to the BSV, wherein newSA is determined by computer implementable steps represented by formula (IV)(b):

$$newSA=SA+(SAR)X$$

wherein SA represents a portion of the total currency value of the BSV that is set aside for absorbing fluctuations of the YV due to overvaluation or undervaluation thereof, wherein SAR is a percentage of the total currency value of the BSV that is set aside for absorbing fluctuations of the YV due to overvaluation or undervaluation thereof, wherein formula (III)(c) comprises:

$$newBSV=BSV\ VS$$

wherein the VS represents the value stream and is determined by computer implementable steps represented by the formula (IV):

$$VS=BSV(D)YV$$

wherein D represents a discount offered by a merchant to users on an item in the form of a given quantity of virtual currency units in lieu or in addition to a given amount of real currency for the purchase of the item, wherein newQ represents a new total amount of virtual currency units held in the virtual bank and not owned by users in light of a previous amount of virtual currency units held in the virtual bank and not owned by users, wherein newQ is determined by computer implementable steps represented by formula (V)(a) or by formula (V)(b) or by formula (V)(c) or by formula (V)(d) or by formula (V)(e), wherein formula (V)(a) comprises:

$$newQ = Q + \frac{X}{C}$$

wherein formula (V)(b) comprises:

$$newQ=Q\ P$$

wherein formula (V)(c) comprises:

$$newQ=Q+Z$$

wherein formula (V)(d) comprises:

$$newQ=Q+D$$

wherein formula (V)(e) comprises:

$$newQ=Q\ D$$

wherein C represents the Golden Ratio φ, wherein P represents the amount of virtual currency units exchanged for a given amount of virtual currency points, wherein Z represents the quantity of virtual currency units that a user converts into real currency, wherein newM represents a new total amount of virtual currency units held in the virtual bank accounts of users in light of a previous amount of virtual currency units held in the virtual bank accounts of users, wherein newM is determined by computer implementable steps represented by formula (VI)(a) or by formula (VI)(b), wherein formula (VI)(a) comprises:

$$newM=M\ Z$$

wherein formula (VI)(b) comprises:

$$newM=M\ D.$$

8. A virtual currency system according to claim 7, wherein execution of the virtual currency controller executable code causes the virtual currency controller to further perform steps comprising:

determining the SA based on the steps represented by formula (IV)(a):

$$SA=(SAR)TDV$$

wherein TDV represents the total currency value in the real bank, wherein SA represents a portion of the total currency value of the BSV that is set aside for absorbing fluctuations of the YV due to overvaluation or undervaluation thereof.

9. A virtual currency system according to claim 1, wherein execution of the virtual currency controller executable code causes the virtual currency controller to further perform steps comprising:

determining the total currency value held in the real bank based on the steps represented by formula (II)(a):

$$TDV=BSV+SA$$

wherein TDV represents the total currency value in the real bank, wherein BSV represents the total amount of real currency in the real bank, wherein SA represents a portion of the total currency value of the BSV that is set aside for absorbing fluctuations of the YVdue to overvaluation or undervaluation thereof.

10. A virtual currency system according to claim 9, wherein execution of the virtual currency controller executable code causes the virtual currency controller to further perform steps comprising:

determining a new total currency value held in the real bank in light of a previous total currency value held in the real bank based on the steps represented by formula (II)(b) or by formula (II)(c) or by formula (II)(d), wherein formula (II)(b) comprises:

$$newTDV=TDV+X$$

wherein formula (II)(c) comprises:

$$newTDV=newBSD+newSA$$

wherein formula (II)(d) comprises:

$$newTDV=(Z)YV$$

wherein newTDV represents the new total currency value held in the real bank, wherein newBSV represents a new amount of real currency held in the real bank in light of a previous amount of real currency held in the real bank, wherein newBSV is determined by computer implementable steps represented by formula (III)(b) or by formula (III)(c), wherein formula (III)(b) comprises:

$$newBSV=BSV+(X\ newSA)$$

wherein formula (III)(c) comprises:

$$newBSV=BSV\ VS$$

wherein X represents the new real currency added to the BSV, wherein newSA is determined by computer implementable steps represented by formula (IV)(b):

$$newSA=SA+(SAR)X$$

wherein SA represents a portion of the total currency value of the BSV that is set aside for absorbing fluctuations of the YV due to overvaluation or undervaluation thereof, wherein SAR is a percentage of the total currency value of the BSV that is set aside for absorbing fluctuations of the YV due to overvaluation or undervaluation thereof, wherein the VS represents the value stream and is determined by computer implementable steps represented by the formula (IV):

$$VS=BSV(D)YV$$

wherein D represents a discount offered by a merchant to users on an item in the form of a given quantity of virtual currency units in lieu or in addition to a given amount of real currency for the purchase of the item, wherein Z represents the quantity of virtual currency units that a user converts into real currency.

11. A computer-implemented method for providing a virtual currency computer-implemented system issuing and managing electronic virtual currency units substantiated by real fiat currency value thereby providing system participating users to purchase products and/or services from system participating merchants with total or partial payment by virtual currency units and for the users to exchange virtual currency units for real currency, the method providing for determining an exchange rate value of the virtual currency units based on a value of real currency in a real bank account of the user thereby providing system participants with a common automatic and real-time fiat money based exchange rate system for the virtual currency units, the method comprising:

providing a real bank account comprising real currency that is accessible online;

providing users access to products and/or services offered by merchants for sale via a graphical user interface in a network communication with one or more merchant controllers configured for such communication, each of the merchant controllers comprising a respective associated memory having controller executable code stored thereon, wherein execution of the merchant controller executable code causes the merchant controller to perform steps comprising: (i) offering products and/or services for purchase to users via the graphical user interface by way of the virtual currency controller; and (ii) receiving total or partial payment by virtual currency units from the virtual user bank accounts by way of the virtual currency controller;

providing a virtual bank comprising a first amount of virtual currency units, the virtual bank being provided by execution of controller executable code stored within a memory associated to a virtual currency controller, wherein the virtual currency controller is in communication with a real bank account, with the one or more merchant controllers and with the graphical user interface;

providing virtual user bank accounts within the virtual bank assigned to users and comprising a second amount of virtual currency units separately allotted into respective ones of the virtual user bank accounts, wherein the virtual currency units in a given bank account assigned to a given user being at an exclusive disposal and accessibility of that given user, the virtual user bank accounts being provided by the execution of the controller executable code stored within the memory associated to the virtual currency controller, the exclusive disposal being provided by the execution of the virtual currency controller executable code providing that given user the exclusive disposal by way of user disposal commands via the graphical user interface, wherein the virtual currency controller receives the user disposal commands via the graphical user interface and executes the disposal commands, wherein disposal of currency units comprises using currency units for exchange for real currency and/or for purchase of products and or services;

determining an exchange rate of the virtual currency units based on a real-time monetary value of real currency in the real bank account, the total of the first amount of virtual currency units and the total of the second amount of virtual currency units, wherein the step of determining the exchange rate is provided by the execution of the controller executable code stored within the memory associated to the virtual currency controller;

providing users to exchange virtual currency units for real currency in the real bank account based on the exchange rate by way of exchange commands via the graphical user interface;

selectively allotting a given amount of virtual currency units to the user based on a purchase of a product and/or service by the user by way of purchase commands via the graphical user interface, wherein the step of selectively allotting a given amount of virtual currency units to the user is provided by the execution of the controller executable code stored within the memory associated to the virtual currency controller;

providing for users to purchase products and/or services with total or partial payment by virtual currency units from their respective user bank accounts by way of purchase commands via the graphical user interface;

determining the exchange rate of the virtual currency based on the steps provided by the execution of the controller executable code stored within the memory associated to the virtual currency controller and represented by formula (I)(a):

$$YV = \frac{BSV}{(Q+M)}$$

wherein YV represents the exchange rate of the virtual currency unit, wherein BSV represents the amount of real currency held in the real bank, wherein Q represents the total amount of virtual currency units held in the virtual bank and not owned by users, and wherein M represents the total amount of virtual currency units held in the virtual bank accounts of users, wherein the graphical user interface is displayed directly superimposed and embedded on a merchant-provided customer interface and allows users to access the merchant-provided customer interfaces via the graphical user interface.

12. A method according to claim 11, further comprising:

providing database of virtual currency points allotted to users based on predetermined requirements stored in the memory associated to the virtual currency controller and being exchangeable for virtual currency units with exchange commands via the graphical user interface, wherein the database of virtual currency points is provided by the execution of the controller executable code stored within the memory associated to the virtual currency controller, wherein selectively allotting a given amount of virtual currency units comprises selectively allotting a given amount of virtual currency points representing a given amount of virtual currency units in lieu of direct virtual currency units.

13. A method according to claim 11, wherein the payment with virtual currency units is deposited in the virtual bank as a part of the first amount or exchanged for real currency based on the exchange rate and deposited in the real bank account.

14. A method according to claim 11, wherein merchants are provided with depositing real currency into the real bank account.

15. A method according to claim 11, wherein the method further comprises:
determining a modified exchange rate of the virtual currency based on the steps provided by the execution of the controller executable code stored within the memory associated to the virtual currency controller and represented by formula (I)(e):

$$\text{modified } YV = \frac{BSV - (D)YV}{(Q+D) + (M-D)}$$

wherein modifiedYV represents the modified exchange rate of the virtual currency unit,
wherein D represents a discount offered by a merchant to users on an item in the form of a given quantity of virtual currency units in lieu or in addition to a given amount of real currency for the purchase of the item.

16. A method according to claim 11, wherein the method further comprises:
determining the BSV based on the steps provided by the execution of the controller executable code stored within the memory associated to the virtual currency controller and represented by the formula (III)(a):

$BSV=(Q)YV+(M)YV.$

17. A method according to claim 11, wherein the method further comprises:
determining a new exchange rate based on the steps provided by the execution of the controller executable code stored within the memory associated to the virtual currency controller and represented by formula (I)(b) or by formula (I)(c) or by formula (I)(d),
wherein formula (I)(b) comprises:

$$newYV = \frac{newBSV}{(newQ + M)}$$

wherein formula (I)(c) comprises:

$$newYV = \frac{newBSV}{(newQ + newM)}$$

wherein formula (I)(d) comprises:

$$newYV = \frac{newBSV}{(Q + newM)}$$

wherein newYV represents a new exchange rate in light of a previous exchange rate YV,
wherein newBSV represents a new amount of real currency held in the real bank in light of a previous amount of real currency held in the real bank, wherein newBSV is determined by computer implementable steps represented by formula (III)(b) or by formula (III)(c),
wherein formula (III)(b) comprises:

$newBSV=BSV+(X\ newSA)$ wherein X represents the new real currency added to the BSV,
wherein newSA is determined by computer implementable steps represented by formula (IV)(b):

$newSA=SA+(SAR)X$ wherein SA represents a portion of the total currency value of the BSV that is set aside for absorbing fluctuations of the YV due to overvaluation or undervaluation thereof,
wherein SAR is a percentage of the total currency value of the BSV that is set aside for absorbing fluctuations of the YV due to overvaluation or undervaluation thereof,
wherein formula (III)(c) comprises:

$newBSV=BSV\ VS$ wherein the VS represents the value stream and is determined by computer implementable steps represented by the formula (IV):

$VS=BSV(D)YV$ wherein D represents a discount offered by a merchant to users on an item in the form of a given quantity of virtual currency units in lieu or in addition to a given amount of real currency for the purchase of the item,
wherein newQ represents a new total amount of virtual currency units held in the virtual bank and not owned by users in light of a previous amount of virtual currency units held in the virtual bank and not owned by users, wherein newQ is determined by computer implementable steps represented by formula (V)(a) or by formula (V)(b) or by formula (V)(c) or by formula (V)(d) or by formula (V)(e),
wherein formula (V)(a) comprises:

$$newQ = Q + \frac{X}{C}$$

wherein formula (V)(b) comprises:

$newQ=Q\ P$ wherein formula (V)(c) comprises:

$newQ=Q+Z$ wherein formula (V)(d) comprises:

$newQ=Q+D$ wherein formula (V)(e) comprises:

$newQ=Q\ D$ wherein C represents Golden Ratio $\varphi$,
wherein P represents the amount of virtual currency units exchanged for a given amount of virtual currency points,
wherein Z represents the quantity of virtual currency units that a user converts into real currency, wherein newM represents a new total amount of virtual currency units held in the virtual bank accounts of users in light of a previous amount of virtual currency units held in the virtual bank accounts of users, wherein newM is determined by computer implementable steps represented by formula (VI)(a) or by formula (VI)(b), wherein formula (VI)(a) comprises:

$$newM = M\ Z$$

wherein formula (VI)(b) comprises:

$$newM = M\ D.$$

18. A virtual currency method according to claim 17, wherein the method further comprises:
   determining the SA based on the steps provided by the execution of the controller executable code stored within the memory associated to the virtual currency controller and represented by formula (IV)(a):

$$SA = B(SAR)TDV$$

wherein TDV represents the total currency value in the real bank,
   wherein SA represents a portion of the total currency value of the BSV that is set aside for absorbing fluctuations of the YV due to overvaluation or undervaluation thereof.

19. A method according to claim 11, wherein the method further comprises:
   determining the total currency value held in the real bank based on the steps provided by the execution of the controller executable code stored within the memory associated to the virtual currency controller and represented by formula (II)(a):

$$TDV = BSV + SA$$

wherein TDV represents the total currency value in the real bank,
   wherein BSV represents the total amount of real currency in the real bank,
   wherein SA represents a portion of the total currency value of the BSV that is set aside for absorbing fluctuations of the YV due to overvaluation or undervaluation thereof.

20. A method according to claim 19, wherein the method further comprises:
   determining a new total currency value held in the real bank in light of a previous total currency value held in the real bank based on the steps provided by the execution of the controller executable code stored within the memory associated to the virtual currency controller and represented by formula (II)(b) or by formula (II)(c) or by formula (II)(d),
   wherein formula (II)(b) comprises:

$$newTDV = TDV + X$$

wherein formula (II)(c) comprises:

$$newTDV = newBSV + newSA$$

wherein formula (II)(d) comprises:

$$newTDV = (Z)YV$$

wherein newTDV represents the new total currency value held in the real bank,
   wherein newBSV represents a new amount of real currency held in the real bank in light of a previous amount of real currency held in the real bank, wherein newBSV is determined by computer implementable steps represented by formula (III)(b) or by formula (III)(c),
   wherein formula (III)(b) comprises:

$$newBSV = BSV + (X\ newSA)$$

wherein formula (III)(c) comprises:

$$newBSV = BSV\ VS$$

wherein X represents the new real currency added to the BSV,
   wherein newSA is determined by computer implementable steps represented by formula (IV)(b):

$$newSA = SA + (SAR)X$$

wherein SA represents a portion of the total currency value of the BSV that is set aside for absorbing fluctuations of the YV due to overvaluation or undervaluation thereof,
   wherein SAR is a percentage of the total currency value of the BSV that is set aside for absorbing fluctuations of the YV due to overvaluation or undervaluation thereof,
   wherein the VS represents the value stream and is determined by computer implementable steps represented by the formula (IV):

$$VS = BSV(D)YV$$

wherein D represents a discount offered by a merchant to users on an item in the form of a given quantity of virtual currency units in lieu or in addition to a given amount of real currency for the purchase of the item,
   wherein Z represents the quantity of virtual currency units that a user converts into real currency.

* * * * *